Figure 1:
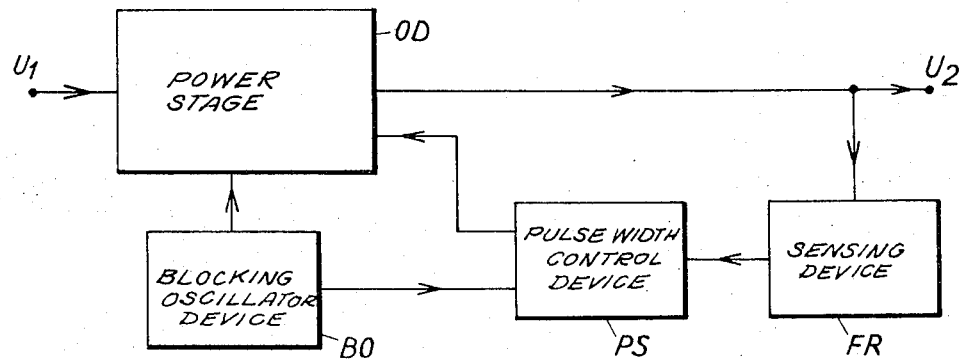

United States Patent [19]
Assow et al.

[11] 3,789,288
[45] Jan. 29, 1974

[54] CONVERTER FOR PRODUCING A STABILIZED OUTPUT DIRECT-CURRENT VOLTAGE FROM AN INPUT DIRECT-CURRENT VOLTAGE

[76] Inventors: Bengt Holger Assow, Ormingeringen 67, Saltsjo-Boo; Curt Evert Jansson, Lingragen 198, Farsta; Kjell Ove Rolleberg, Spelvagen 5, Trangsund, all of Sweden

[22] Filed: Oct. 19, 1971

[21] Appl. No.: 190,597

[30] Foreign Application Priority Data
Nov. 27, 1970 Sweden.............................. 16069/70

[52] U.S. Cl. ...................................... 321/2, 321/18
[51] Int. Cl. ............................................ H02m 3/28
[58] Field of Search.................................. 321/2, 18

[56] References Cited
UNITED STATES PATENTS

| | | | |
|---|---|---|---|
| 3,418,557 | 12/1968 | Schaefer.............................. | 321/18 |
| 3,325,716 | 6/1967 | Gomi...................................... | 321/2 |
| 3,373,334 | 3/1968 | Geisz et al. ........................... | 321/2 |
| 3,378,751 | 4/1968 | Walker................................. | 321/18 X |
| 3,432,737 | 3/1969 | Hunter et al........................... | 321/2 |

Primary Examiner—William M. Shoop, Jr.

[57] ABSTRACT

The present disclosure relates to a converter for producing a stabilized output D.C. voltage from an input D.C. voltage. The stabilization of the output voltage is carried out by means of pulse width regulation of a rectangular wave voltage obtained from the chopped input voltage. The level of the output voltage is sensed by means of a sensing device and compared with a reference voltage, whereby an error signal is obtained. A blocking oscillator device is on one hand triggering a driving stage which controls the chopping of the input voltage, and is on the other hand delivering a saw tooth voltage in order to add the same to the error signal. The sum of said signals is fed to a pulse width control device for controlling said pulse width regulation.

6 Claims, 6 Drawing Figures

CONVERTER FOR PRODUCING A STABILIZED OUTPUT DIRECT-CURRENT VOLTAGE FROM AN INPUT DIRECT-CURRENT VOLTAGE

This invention relates to converters to be used to convert D.C. voltage into D.C. voltage and more particularly to converters for producing a stabilized output D.C. voltage from an input D.C. voltage.

A known principle for such converters is that the incoming D.C. voltage which is to be stabilized is chopped or pulsed by means of two push-pull connected switches (generally power transistors). The rectangular wave voltage thus obtained is supplied via a transformer to a rectifier. The rectified voltage then passes through a smoothing filter in which the alternating voltage components of the rectified voltage are filtered out. The purpose of the conversion into a pulse train is that the level of the rectified and smoothed output voltage may be regulated in dependence on a reference voltage in such a way that a stabilized output voltage is obtained. In this case the regulation is generally carried out in such a way that the pulse duration of the rectangular wave voltage generated by the switches is varied while the period of this voltage is maintained constant. Thus, the average value of the rectified (and smoothed) voltage can be varied and a stabilized output voltage is obtained.

An example of such a previously known converter appears from the article "Power supplies" in the periodical "The Bell System Technical Journal", 1969, p.1047-1055. In conformity with this invention this converter is used in remote feeding units for telecommunication systems. In the converter shown on page 1050 in FIG. 3, the regulation of the pulse width( the pulse area) is carried out by means of a magnetic amplifier ( see pages 1051-1052). These types of amplifiers generally have the disadvantage of being expensive and require considerable construction time in order to obtain desired conditions. The present invention relates to a converter in which the regulation of the pulsed D.C. voltage ( and accordingly stabilization of the output voltage) is carried out by means of circuits of transistors and resistor-capacitor combinations assembled in a relatively simple manner.

An object of this invention is to provide a converter of the kind mentioned above where an accurate stabilization of incoming direct-current voltage can be obtained with few and cheap components.

Another object is to provide a converter of the above-mentioned kind where input and output are D.C. isolated so that the converter can be used for either positive or negative ground. The output voltage can be higher or lower than the input voltage.

Figure 4A:
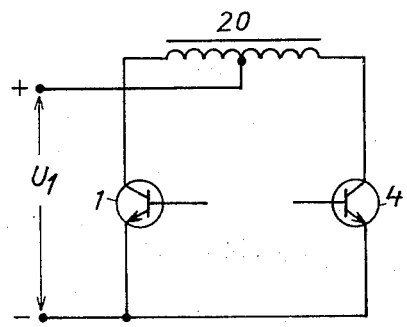
Figure 4B:
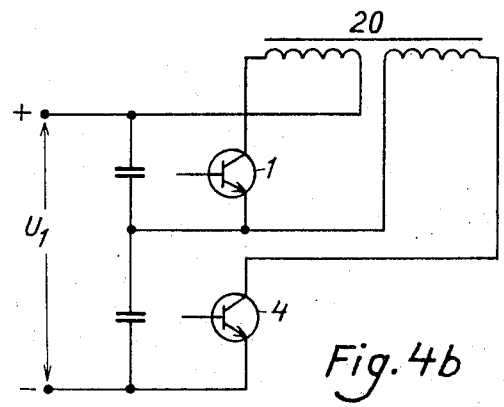
Figure 4C:
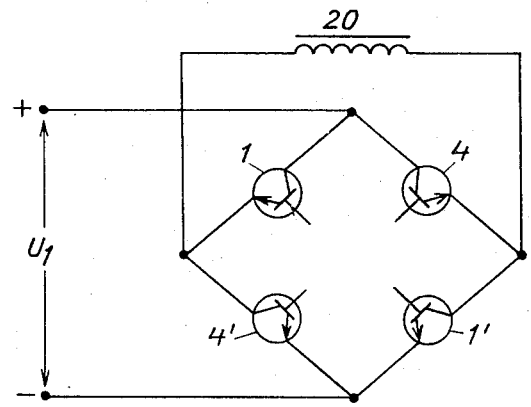
Figure 2:
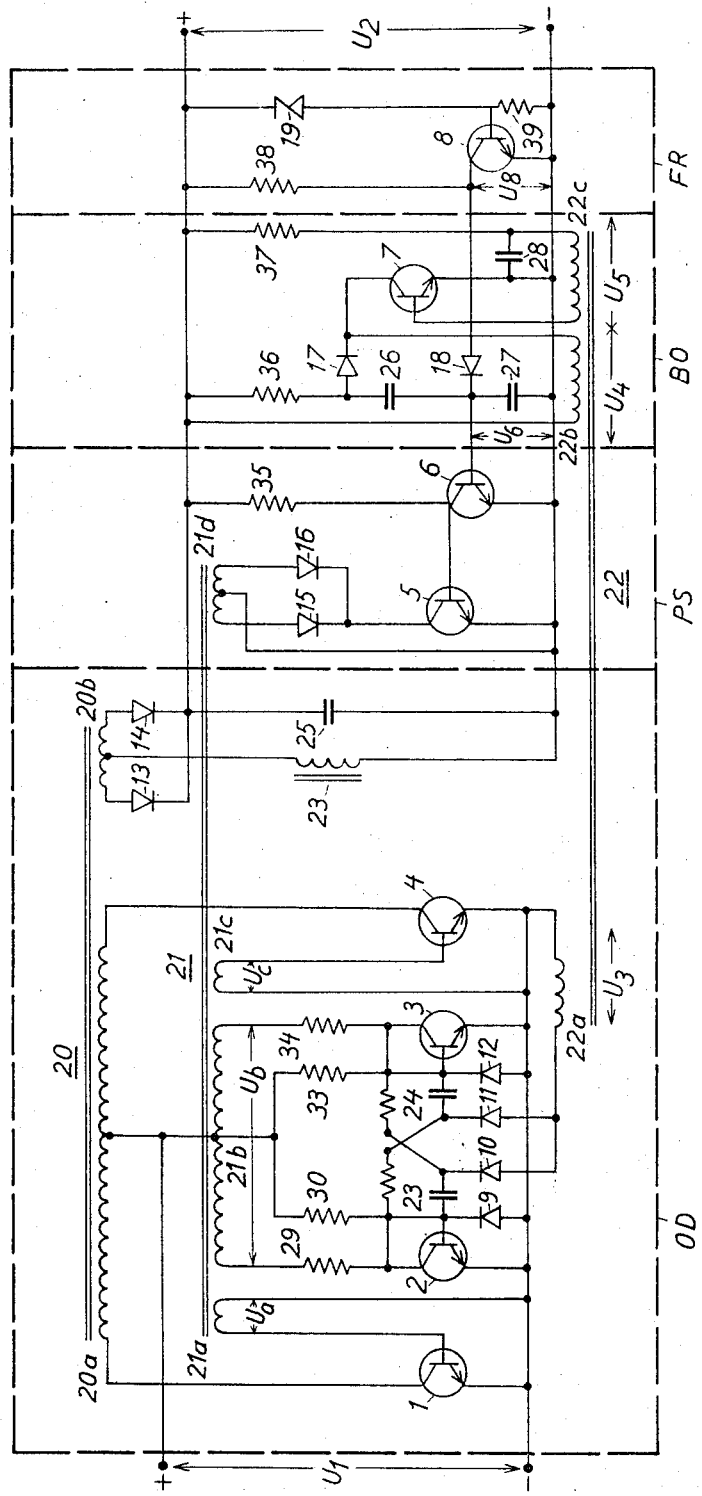
Figure 3:
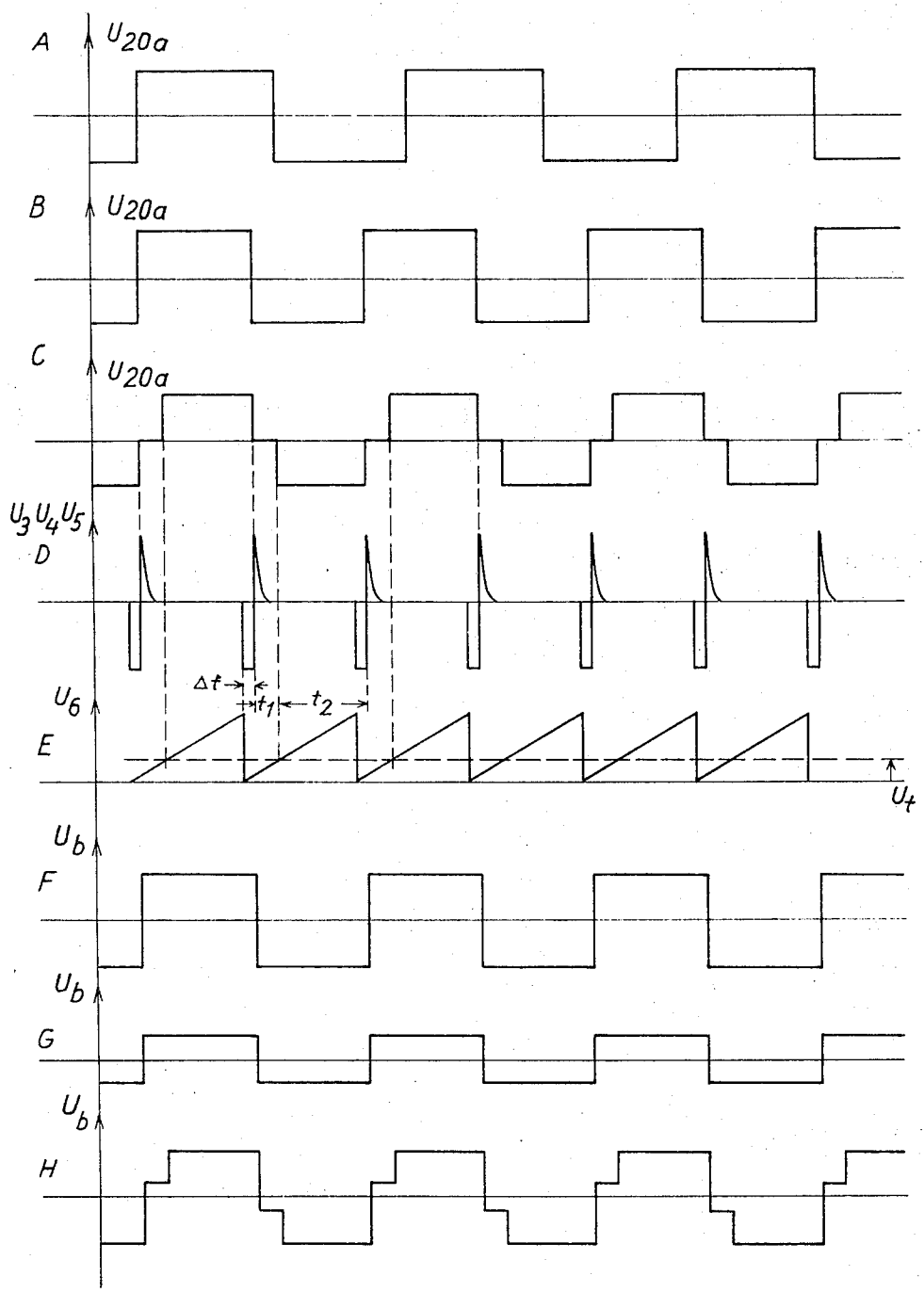

Other objects and advantages of the invention will be apparent from the characteristics of the invention according to the appended claims and in connection with the description and the drawings in which, FIG. 1 shows a block diagram of a converter according to the invention;

FIG. 2 shows a circuit diagram of a converter according to the invention, described more fully, FIG. 3 shows waveforms of different voltages appearing in the circuit diagram according to FIG. 2; and FIG. 4 shows alternative embodiments of the power stage of a converter according to the invention.

FIG. 1 shows a block diagram of a stabilized D.C.voltage converter according to the invention. In the figure OD indicates the power stage of the converter with its driving stage where an incoming D.C. voltage $U_1$, by means of two push-pull connected transistors, is chopped with a predetermined frequency into a square wave, is transformed, rectified and then filtered. The frequency can be selected arbitrarily within certain limits, a suitable value is for example 20 kHz. The stabilization of the output voltage $U_2$ is carried out by means of pulse width regulation, i.e. the waveform of the rectangular wave voltage is changed in such a way that power is transferred during shorter and longer intervals respectively of the period. The level of the output voltage is then sensed by means of a sensing device FR and is compared with a reference voltage, an error signal thus being obtained. This error signal is, added to a saw tooth voltage, fed to a pulse width control device PS. A characteristic feature of the invention is that a blocking oscillator device BO is connected to the power and driving stage OD and to the pulse width control device PS, the blocking oscillator device on the one hand triggering the driving stage to the appropriate operation frequency, and on the other hand delivering to the pulse width control device said saw tooth voltage, to which the error signal obtained from the sensing device FR is added.

The error signal together with a saw tooth voltage then activate the driving stage of the converter in consequence of which the pulse time of the rectangular wave voltage is varied. As a result a stabilized voltage $U_2$ is obtained on the output of the converter.

With reference to FIG. 2 the circuit elements of the converter will be more fully described where the parts framed by dashed lines correspond to the blocks according to FIG. 1.

The power stage includes two power transistors 1,4 whose collectors are connected via the primary winding 20a to a transformer 20. The controlling of these power transistors to their conductive and non-conductive state is carried out via a driving stage in such a way that one of the two power transistors or none of them conducts. The driving stage includes a multivibrator with the transistors 2,3 and associated circuit elements comprising resistors 29-34 and capacitors 23,24. The multivibrator is triggered via the transformer 22 and the diodes 10,11 to a certain operation frequency which will be more fully described below. Via the transformer 21 the pulses received from the multivibrator are supplied to the control input of each power transistor.

The secondary winding 20b of the transformer 20 supplies the rectangular wave voltage to a full-wave rectifier consisting of the diodes 13 and 14 and this rectified voltage is smoothed by means of a choke 23 and a capacitor 25. The output voltage $U_2$ is sensed by means of a Zener diode 19 connected in series with a resistor 39. The Zener voltage $U_{zo}$ of the Zener diode 19 constitutes the reference voltage and the voltage drop across the resistor 39 produces an error signal which as an input voltage is applied to an amplifier stage consisting of the transistor 8 and the resistor 38. Thus on the collector of the transistor 8 the error signal appears amplified.

The blocking oscillator device BO includes two sub-circuits one of which comprises the transistor 7, the capacitor 28 and the resistor 37 and windings 22b and 22c associated with the transformer 22. This part of the blocking oscillator device generates an output voltage $U_4$ across the winding 22b associated with the transformer 22. The frequency of this voltage is chosen in such a way that it constitutes twice the frequency of the power stage. Through the two windings 22b and 22c of the transformer 22 the necessary feedback is obtained. An example of a known blocking oscillator is found in the Swedish publication "Transistor pulse circuits" by Markesjo, part I, page 149. A part of the output voltage $U_4$ is supplied to the other sub-circuit of the blocking oscillator device BO. This sub-circuit includes the capacitors 26,27, the resistor 36 and the diode 17. This circuit constitutes an integrating circuit with an output voltage $U_6$ across the capacitor 27. The input voltage $U_4$ fed to this circuit consists of a pulse train, and for this reason the output voltage $U_6$ is fundamentally a saw tooth voltage having a frequency equal to that of the input voltage $U_4$. However, to the junction point between the capacitors 26 and 27, the output of the amplifier stage FR has been connected via the diode 18. For this reason the saw tooth voltage will be increased and decreased corresponding to the variation of the potential $U_8$.

The pulse width control device PS includes two cascade connected transistors 5 and 6. To the collector of the transistor 5, two diodes 15 and 16 are connected. These will be conducting or blocked in dependence on the variation of the collector voltage of the transistor 5. When one of the two diodes is conducting the secondary winding 21d of the transformer 21 which is connected to the anodes of the diodes 15 and 16, will be short-circuited. Consequently the three windings 21a, 21b and 21c will also be short-circuited and only a certain residual voltage is to be found across these windings. This means that the voltages $U_a$ and $U_c$ which control the conducting and the non-conducting states respectively, of the power transistors 1 and 4 will be so small that both power transistors are non-conducting, and, as a consequence, the power pulses delivered by the transformer 20 are inhibited. In the multivibrator, the resistor 29 and 34 have been dimensioned in such a way that their function is not disturbed when the winding 21b of the transformer 21 is short-circuited. This implies that they have been given a comparatively high value which furthermore serves to limit the base currents to the power transistors. In series with the base of each power transistor a resistor-capacitor combination or a diode can be connected. Accordingly the base charge is rapidly removed and consequently shorter switchover times will be obtained which in turn provides a higher efficiency in the converter. Even an increase of the residual voltage across the transformer 21 when short-circuited affords a more rapid switch-over time.

Referring to the waveform of FIG. 3, the operation of the converter will be described. The converter starts with the multivibrator self-oscillating at a frequency that is lower than the operation frequency. This appears from waveform A which shows the voltage across the transformer winding 20a upon starting. Each one of the two power transistors conducts separately during a half-period. After several milliseconds the output voltage $U_2$ has risen to a value immediately below the nominal value, which is sufficient for the blocking oscillator device BO which is operated by this voltage to begin to deliver driving pulses to the multivibrator which is triggered to the appropriate operation frequency. Compare waveform B. When the output voltage has risen to a nominal value, the pulse width regulation is carried out by short-circuiting the transformer 21. This has the consequence that the driving voltages $U_a$ and $U_c$, in accordance with what has been mentioned above, obtain a low value so that both power transistors are blocked, consequently which the voltage pulses appearing across the transformer winding 20a during a certain time, indicated by $t_1$ in waveform E, are inhibited. Hereby the average value during one period of the rectified voltage will decrease implying that the level of the output voltage decreases as is apparent from waveform C.

The blocking oscillator device delivers a signal across the transformer windings 22b, 22c, as shown in waveform D. This waveform consists of repeated pulses having a frequency that is twice the pulse frequency of the power stage and driving stage of the converter, in order to secure a symmetrical waveform of the voltage across the transformer 20. At the termination of each such pulse from the blocking oscillator device, an inverse pulse appears in the transformer 22 because of the energy stored in this transformer, and this inverse pulse is supplied via the winding 22a to the multivibrator thus triggering the same to the appropriate operation frequency. The saw tooth voltage generated by the blocking oscillator is fed together with the error signal obtained from the circuit FR to the base of the transistor 6 in the pulse width control device PS. This voltage is indicated by $U_6$ and is shown in waveform E.

If the output voltage $U_2$ is equal to the reference voltage $U_{zo}$ of the Zener diode 19 little or no current will pass through the resistor 39. This implies that the transistor 8 is blocked and the potential $U_8$ of the collector assumes a high value. This has the consequence that the level of the saw tooth voltage is so high that the transistor 6 to the base of which this voltage, will be conducting the whole time. Thereby all current passes through the resistor 35 and through the transistor 6, and the transistor 5 receives no base current. Thus the transistor 5 is completely blocked, the potential of its collector is high and accordingly the diodes 15 and 16 are blocked. Thus the winding 21d of the transformer 21 is not short-circuited and for this reason the multivibrator works completely undisturbed and delivers driving pulses to the windings 21a and 21c. Thus the power transistors will be operated alternatingly and an output voltage across the winding 20a according to waveform B is obtained.

If now the output voltage $U_2$ should increase above the Zener voltage $U_{zo}$ of the Zener diode 19, a current will flow through the resistor 39. The result is that the potential $U_8$ according to FIG. 2 will decrease in value. Possibly the transistor 8 will receive so much current that it saturates completely, the potential $U_8$ thereby decreasing to a value near zero. The saw tooth voltage $U_6$ from the blocking oscillator then will not reach the value that is necessary to make the transistor 6 conducting, which has the consequence that the transistor 5 receives base current from the resistor 35 and is brought to its conducting state. This implies that the diodes 15 and 16 begin to conduct and the transformer winding 21d is short-circuited. This short-circuiting is maintained for so long a time as the voltage $U_6$ is below the value that causes the transistor 6 to saturate. This time is indicated by $t_1$ in waveform E while the time during which the short-circuiting ceases is indicated by $t_2$. From waveform B it appears that the saw tooth voltage $U_6$ is below the threshold level $U_t$ during the time $t_1$, and for this reason the transformer 21 is short-circuited during this time, while the saw tooth voltage $U_6$ exceeds the threshold level during the time $t_2$ when the short-circuiting ceases. In waveform E the threshold value $U_t$ is constant whereas the level of the saw tooth voltage varies in accordance with the error signal. From waveform H is seen that the multivibrator delivers so small a voltage to the power transistors during the time $t_1$ that these remain in a blocked condition while, during the time $t_2$, driving voltage is supplied to said transistors and each of them conducts separately in turn during a half-period of the voltage across the transformer 20. Compare waveform C. Waveform F shows a completely undisturbed multivibrator voltage and waveform G the multivibrator voltage when the transformer is short-circuited during the whole period. From these waveforms it appears that if the transformer is short-circuited during the time $t_1$ while the short-circuiting ceases during the time $t_2$, the waveform of the voltage $U_b$ will be obtained ( and accordingly also the voltages $U_a$ and $U_c$) according to waveform H.

It should be noticed that the phase of the saw tooth voltage together with the amplified error signal ( the voltage $U_6$) is such that a short-circuiting starts each time the multivibrator changes its condition and a power transistor ceases to conduct. It is furthermore important that the blocking oscillator device generates the jump in the saw tooth voltage before triggering the driving stage via the winding 22a. Otherwise there is a risk that one of the power transistors conducts a short instant before a possible short-circuiting of the transformer 21 is to take place. This time delay $\Delta t$ is achieved by producing the jump in the saw tooth voltage at the beginning of the blocking oscillator pulse ( according to waveform D) and by triggering the multivibrator at the termination of the pulse with the stored energy which then is released from the transformer 22 in the way described above.

The power stage of the converter can be designed in many ways dependent on the amplitude of the input voltage $U_1$. FIGS. 4a,b,c show the design of the power stage for use with an input voltage that is low, high and both low and high, respectively.

We claim:

1. A converter for producing a stabilized output DC voltage from an input DC voltage comprising at least two switching means for switching the input DC voltage to a rectangular wave form voltage, a first transformer having a primary winding with a center tap and a secondary winding, said primary winding being connected to said switching means, a full wave rectifier, a smoothing filter means for connecting said secondary winding said full wave rectifier and said smoothing filter to provide an output circuit for the converter, a second transformer having a primary winding and at least one secondary winding, a driving stage comprising a multivibrator circuit connected to one input of the converter and to the center tap of the primary winding of said first transformer, said driving stage being adapted to activate said switching means across the primary winding of said second transformer alternatingly and periodically, sensing amplifier means for sensing the output voltage of the converter and for comparing this voltage with a constant reference voltage, said sensing amplifier means generating an error signal if the output voltage differs from the reference voltage, a blocking oscillator means for generating on the one hand oscillator pulses which are supplied to said driving stage as trigger pulses, and on the other hand generating a saw tooth voltage, the decrease of which being produced at the beginning of each of said oscillator pulses, a third transformer having a primary winding connected to said blocking oscillator means and a secondary winding connected to said driver stage, a pulse width control means receiving the saw tooth voltage when added to said error signal for inhibiting the pulses from said driving stage during a time interval when the saw tooth voltage is below a predetermined threshold value whereby the pulse width of said rectangular waveform generated by each of said switching means is varied.

2. A converter according to claim 1 wherein the pulse width control device includes an amplifier stage the output of which is connected to a full-wave rectifier which in dependence on the value of the saw tooth voltage is adapted to short-circuit a further winding of said second transformer whereby the control pulses from said driving stage to the switches are inhibited.

3. A converter according to claim 2, wherein the trigger pulses delivered from the blocking oscillator means to the driving stage have a frequency which is twice the frequency of those pulses which are generated by the switching means.

4. A converter according to claim 1 wherein said trigger pulses to the driving stage consist of the inverse pulses which arise in said third transformer upon the presence of said oscillator pulses whereby a certain time delay between the beginning of the saw tooth voltage and a trigger pulse is obtained.

5. A converter according to claim 1 wherein said switching means comprise power transistors.

6. A converter according to claim 1 wherein said multivibrator comprises two transistors having collectors to the resistor means for connecting each of said collectors to the primary winding of said second transformer, and said second transformer has first and second secondary windings for respectively controlling different ones of said switching means.

* * * * *